United States Patent
Hong et al.

(10) Patent No.: US 11,515,084 B2
(45) Date of Patent: Nov. 29, 2022

(54) MAGNETIC COMPONENT AND WIRELESS POWER-TRANSFERRING DEVICE INCLUDING THE SAME

(71) Applicant: Delta Electronics, Inc., Taoyuan (CN)

(72) Inventors: Tianding Hong, Taoyuan (CN); Zengyi Lu, Taoyuan (CN); Haijun Yang, Taoyuan (CN); Jinfa Zhang, Taoyuan (CN)

(73) Assignee: Delta Electronics, Inc., Taoyuan (CN)

( * ) Notice: Subject to any disclaimer, the term of this patent is extended or adjusted under 35 U.S.C. 154(b) by 561 days.

(21) Appl. No.: 16/564,054

(22) Filed: Sep. 9, 2019

(65) Prior Publication Data
US 2020/0111606 A1 Apr. 9, 2020

(30) Foreign Application Priority Data

Oct. 8, 2018 (CN) .......................... 201811168255.3

(51) Int. Cl.
*H01F 38/14* (2006.01)
*H02J 50/10* (2016.01)
(Continued)

(52) U.S. Cl.
CPC ........... *H01F 38/14* (2013.01); *H01F 27/245* (2013.01); *H01F 27/2823* (2013.01);
(Continued)

(58) Field of Classification Search
CPC .... H01F 38/14; H01F 27/245; H01F 27/2823; H01F 27/323; H01F 27/363; H01F 27/40;
(Continued)

(56) References Cited

U.S. PATENT DOCUMENTS 10,283,997 B2 5/2019 Satyamoorthy et al.
10,485,478 B1 11/2019 Mirov et al.
(Continued)

FOREIGN PATENT DOCUMENTS

CN 1097276 C 12/2002
CN 101271762 A 9/2008
(Continued)

OTHER PUBLICATIONS

The USNOA dated Nov. 16, 2020 by the USPTO.
The CN1OA dated Aug. 4, 2020 by the CNIPA.
CN1OA for CN application No. 201811168255.3 dated Jul. 1, 2019.

*Primary Examiner* — Lincoln D Donovan
*Assistant Examiner* — Alex W Lam
(74) *Attorney, Agent, or Firm* — Qinghong Xu

(57) ABSTRACT

The present disclosure provides a magnetic component including a winding, a first magnetic core and a circuit component, and a wireless power-transferring device including the magnetic component. The winding is formed by winding a coil, and having a first penetration portion at a middle portion of the winding. The first magnetic core is disposed at a side of the winding, and a first insulating support portion is disposed between the first magnetic core and the winding. The circuit component is located within the first penetration portion and electrically connected with the (Continued)

winding. Disposing the circuit component within the first penetration portion at the middle portion of the winding can effectively save space.

18 Claims, 15 Drawing Sheets

(51) Int. Cl.
| | |
|---|---|
| *H01F 27/32* | (2006.01) |
| *H01F 27/40* | (2006.01) |
| *H01F 27/28* | (2006.01) |
| *H01F 27/245* | (2006.01) |
| *H01F 27/36* | (2006.01) |
| *H02J 7/02* | (2016.01) |

(52) U.S. Cl.
CPC ......... *H01F 27/323* (2013.01); *H01F 27/363* (2020.08); *H01F 27/40* (2013.01); *H02J 50/10* (2016.02); *H02J 7/025* (2013.01)

(58) Field of Classification Search
CPC ...... H01F 27/36; H01F 27/2871; H01F 27/38; H01F 27/025; H01F 27/366; H01F 27/288; H01F 27/28; H01F 27/22; H02J 50/10; H02J 7/025; H02J 50/00; H02J 50/70; H02J 50/20; H02J 50/40; H02J 7/02; H02J 50/12; H02J 50/005; H02J 50/80; H02J 50/27; H02J 7/0042; H04B 5/0037; H04B 5/00; H05K 5/03; H05K 7/209; H05K 9/006; H05K 9/0075; H05K 7/2039; H05K 9/0081; Y02T 90/14; Y02T 10/70; Y02T 10/7072

See application file for complete search history.

(56) References Cited

U.S. PATENT DOCUMENTS

| | | | | |
|---|---|---|---|---|
| 2004/0108929 | A1* | 6/2004 | Ichikawa | ............ H01F 27/2823 336/83 |
| 2004/0257190 | A1 | 12/2004 | Peck et al. | |
| 2010/0315038 | A1* | 12/2010 | Terao | ...................... H01F 38/14 320/108 |
| 2014/0375411 | A1* | 12/2014 | Scholz | .................. H01F 27/323 336/200 |
| 2015/0130575 | A1* | 5/2015 | Eom | ..................... H01F 27/323 336/83 |
| 2015/0364938 | A1 | 12/2015 | Lapetina et al. | |
| 2016/0268848 | A1 | 9/2016 | Nalbant | |
| 2017/0178792 | A1* | 6/2017 | Yang | ..................... H01F 27/324 |
| 2017/0324170 | A1 | 11/2017 | Kerselaers et al. | |
| 2018/0069600 | A1 | 3/2018 | Kowalski et al. | |
| 2019/0122814 | A1* | 4/2019 | Hung | ................. H01F 27/2804 |

FOREIGN PATENT DOCUMENTS

| | | |
|---|---|---|
| CN | 101615496 A | 12/2009 |
| CN | 101651031 B | 7/2011 |
| CN | 104578439 A | 4/2015 |
| CN | 106328356 A | 1/2017 |
| CN | 106684935 A | 5/2017 |
| CN | 107025989 A | 8/2017 |
| CN | 107768121 A | 3/2018 |
| CN | 108364761 A | 8/2018 |
| JP | 2000092752 A | 3/2000 |

* cited by examiner

MAGNETIC COMPONENT AND WIRELESS POWER-TRANSFERRING DEVICE INCLUDING THE SAME

CROSS-REFERENCE TO RELATED APPLICATIONS

This application is based upon and claims priority to Chinese Patent Application No. 201811168255.3, filed on Oct. 8, 2018, the entire content of which is herein incorporated by reference for all purpose.

TECHNICAL FIELD

The present disclosure relates to the field of electronic technology, particularly to a magnetic component and a wireless power-transferring device including the same.

BACKGROUND

Wireless Power Transfer (WPT) technology is convenient, reliable and safe. It becomes more and more widely used, for example, a wireless charging pad may quickly and easily provide power from a charger to electrical equipment.

In the development of a wireless power-transferring device, in order to make the structure of the wireless power-transferring device compact, the circuit component in the wireless power-transferring device may be integrated with the magnetic component such as a transformer. Due to the size limitation of the wireless power-transferring device, the circuit component cannot be pulled too far apart from the winding of the magnetic component. However, when the circuit component is close to the winding of the magnetic component, the conductor in the circuit component is placed in a high-frequency magnetic field, which is affected by the eddy current effect and generates a large degree of heat, thereby leading to a risk of overheating of the circuit component and the entire wireless power-transferring device.

SUMMARY

Based on the above problems, the present disclosure provides a magnetic component and a wireless power-transferring device including the same.

According to an aspect of the present disclosure, there is provided a magnetic component including a winding, a first magnetic core and a circuit component. The winding is formed by winding a coil, and having a first penetration portion at a middle portion of the winding. The first magnetic core is disposed at a side of the winding, and a first insulating support portion is disposed between the first magnetic core and the winding. The circuit component is located within the first penetration portion and electrically connected with the winding.

According to another aspect of the present disclosure, there is provided a wireless power-transferring device including a transmitting pad and a receiving pad which include the above-described magnetic component.

The present disclosure can effectively save space by disposing the circuit component within the first penetration portion at the middle portion of the winding.

DETAILED DESCRIPTION

Figure 1:
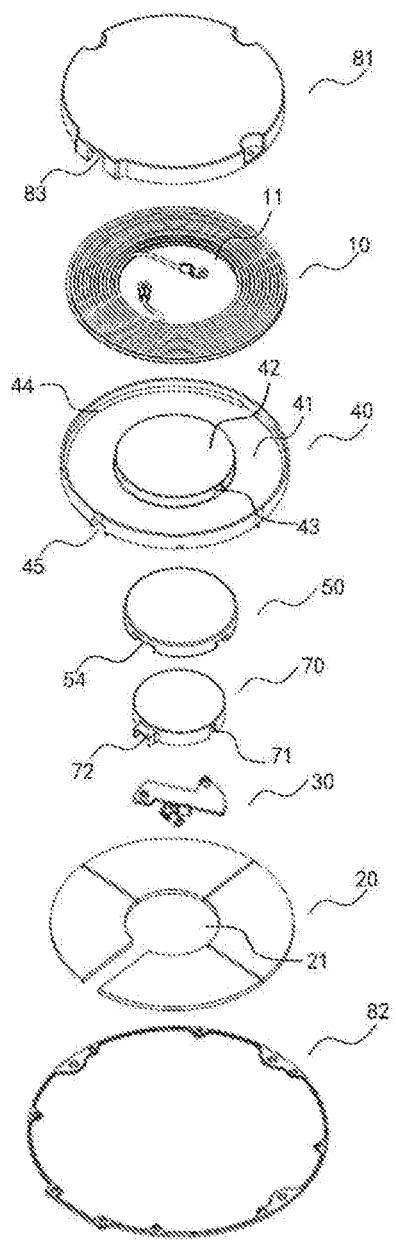
FIG. 1 is an exploded view of a magnetic component according to an embodiment of the present disclosure.

Example embodiments will now be described more fully with reference to the accompanying drawings. However, the example embodiments can be embodied in a variety of forms, and should not be construed as being limited to the embodiments set forth herein; rather, these embodiments are provided so that this disclosure will be thorough and complete, and the concepts of the example embodiments will be fully given to those skilled in the art. In the drawings, the thickness of the region and layer may be exaggerated for clarity. The same reference numerals in the drawings denote the same or similar structures, and thus their detailed descriptions will be omitted.

Furthermore, the described features, structures or characteristics may be combined in any suitable manner in one or more embodiments. In the following description, many specific details are provided for fully understanding embodiments of the present disclosure. However, those skilled in the art will appreciate that the technical solution of the present disclosure may be practiced without one or more of the specific details, or other methods, components, materials, and the like may be employed. In other instances, well-known structures, materials or operations are not shown or described in detail to avoid obscuring the present disclosure.

Figure 2:
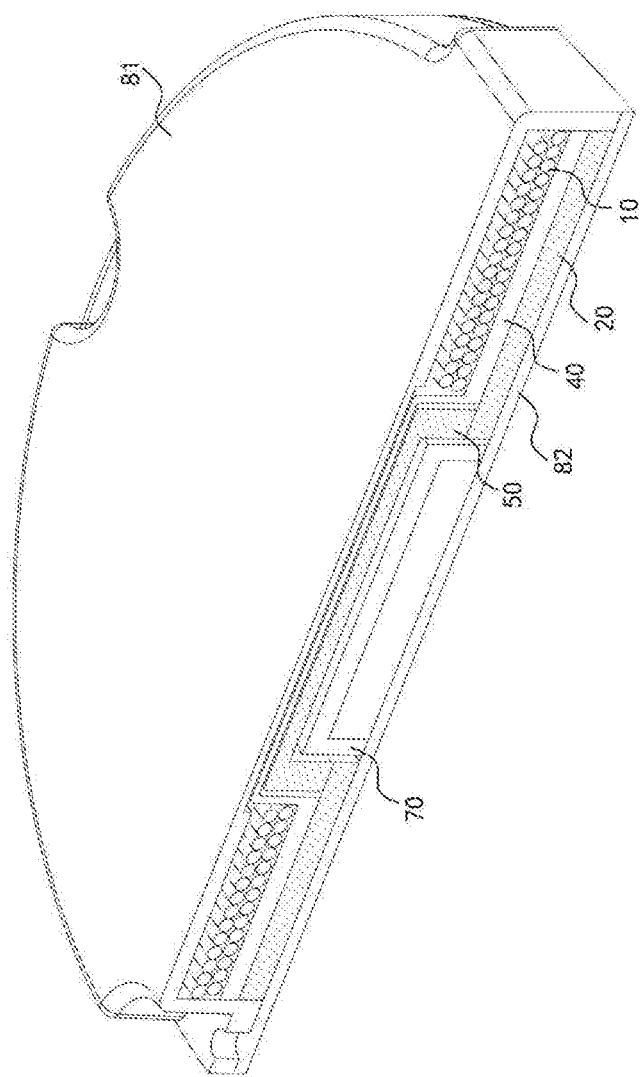
FIG. 2 is a cross-sectional view of a magnetic component according to an embodiment of the present disclosure.
Figure 3:
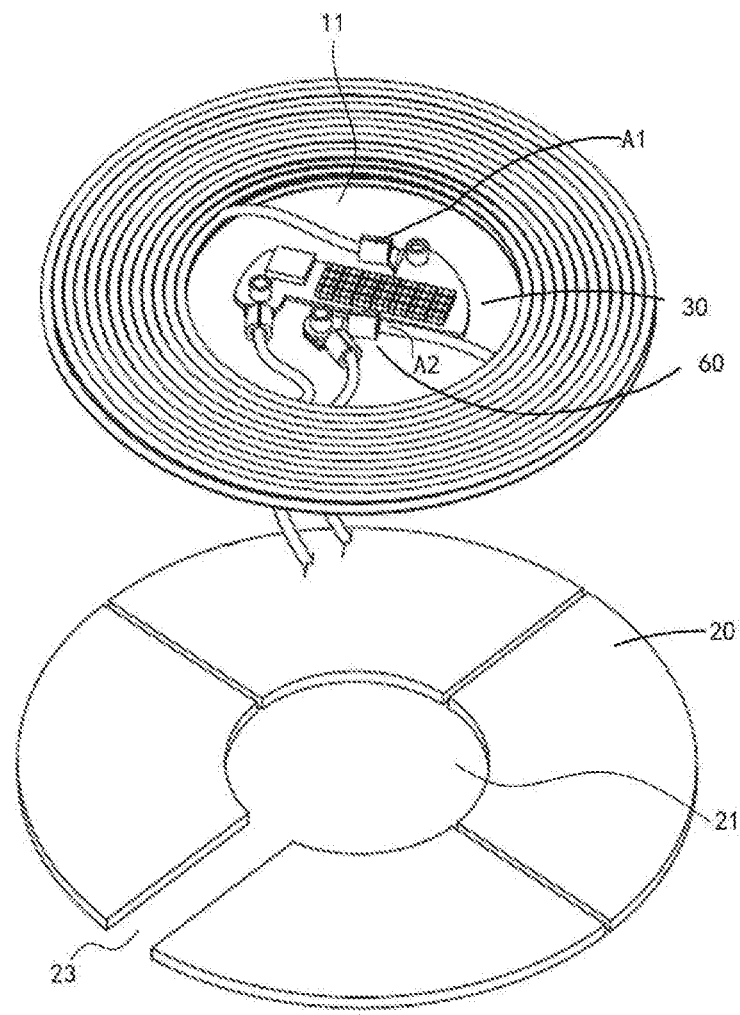
FIG. 3 is an exploded view of a first magnetic core, a circuit component and a winding of a magnetic component according to an embodiment of the present disclosure.

Referring to FIGS. 1-3, an embodiment of the present disclosure provides a magnetic component including a winding 10, a first magnetic core 20 and a circuit component 30. Here, the winding 10 is formed by winding a coil, and the middle portion of the winding 10 has a first penetration portion 11. The first magnetic core 20 is disposed at a side (or surface) of the winding 10, and a first insulating support portion 40 is disposed between the first magnetic core 20 and the winding 10. The circuit component 30 is located within the first penetration portion 11 and is electrically connected with the winding 10.

In the present embodiment, by disposing the circuit component 30 within the first penetration portion 11 at the middle portion of the winding 10, space can be effectively utilized. The first insulating support 40 disposed between the first magnetic core 20 and the winding 10 may be used to carry the winding 10 on the one hand, and to insulate the first magnetic core 20 from the winding 10 on the other hand. The first magnetic core 20 is used to conduct magnetism to increase the amount of inductance.

The magnetic component is further described below in combination with FIGS. 1-3 and with reference to FIGS. 4-7.

Figure 4:
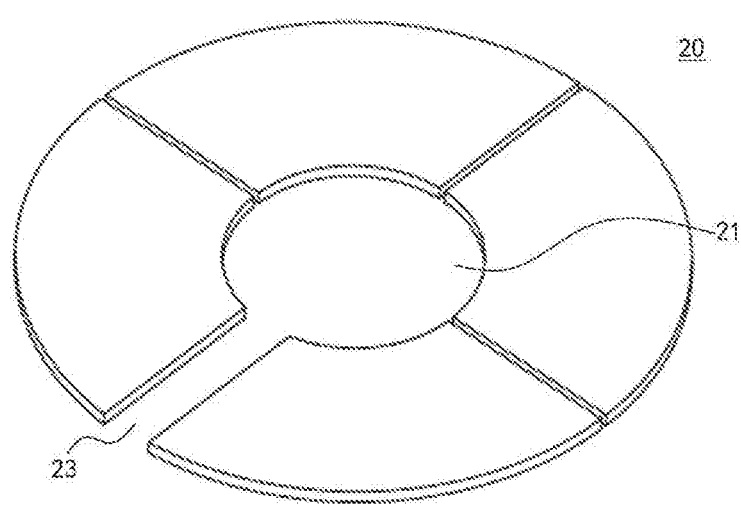
FIG. 4 is a perspective view of a first magnetic core of a magnetic component according to an embodiment of the present disclosure.
Figure 5:
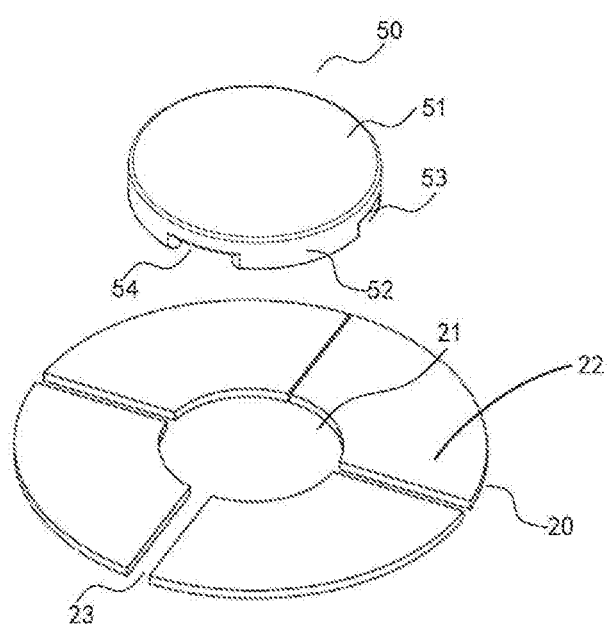
FIG. 5 is an exploded view of a first magnetic core and a second magnetic core of a magnetic component according to an embodiment of the present disclosure.

In some embodiments, the middle portion of the first magnetic core 20 has a second penetration portion 21 disposed coaxially with the first penetration portion 11, and the second penetration portion 21 may be used to accommodate the circuit component 30 as well. As shown in FIGS. 4 and 5, the first magnetic core 20 includes a plurality of magnetic sheets 22 spliced to form a ring, and the second penetration portion 21 is the inside of the ring. It should be understood that the present embodiment is described by taking the first magnetic core 20 with the spliced structure as an example, but the structure of the first magnetic core 20 is not limited thereto, and may be, for example, an integrally formed structure or the like.

In some embodiments, the magnetic component further includes a second magnetic core 50. The second magnetic core 50 includes a cover plate 51 and a raised portion 52 disposed at a side of the cover plate 51. An accommodation space 55 is formed between the cover plate 51 and the raised portion 52. The circuit component 30 is located within the accommodation space 55, and the second magnetic core 50 is located within the first penetration portion 11. The second magnetic core 50 can enhance coupling between the windings 10 and can enhance the shielding effect on the circuit component 30 at the middle portion of the winding 10 as well. The second magnetic core 50 can prevent almost all of the magnetic lines from passing through the first penetration portion 11 at the middle portion of the winding 10, so that the conductor inside the first penetration portion 11, i.e., the circuit component 30, is in a position where the magnetic field is extremely weak, thereby capable of avoiding the problem of overheating caused by heating of a high frequency magnetic field.

Figure 6:
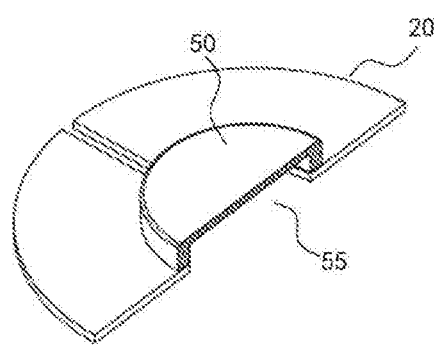
FIG. 6 is a cross-sectional view of a combined state of a first magnetic core and a second magnetic core of a magnetic component according to an embodiment of the present disclosure.

In some embodiments, as shown in FIGS. 5 and 6, one end of the raised portion 52 of the second magnetic core 50 is connected with the cover plate 51, and the other end of the raised portion 52 is connected with the first magnetic core 20. The second penetration portion 21 is opened up with the accommodation space 55. At this time, an opened-up space is formed between the second magnetic core 50 and the first magnetic core 20, for accommodating the circuit component 30. In addition, since the second magnetic core 50 is connected with the first magnetic core 20, it is advantage for the magnetic flux to be smoothly transmitted from the second magnetic core 50 to the first magnetic core 20.

Figure 7:
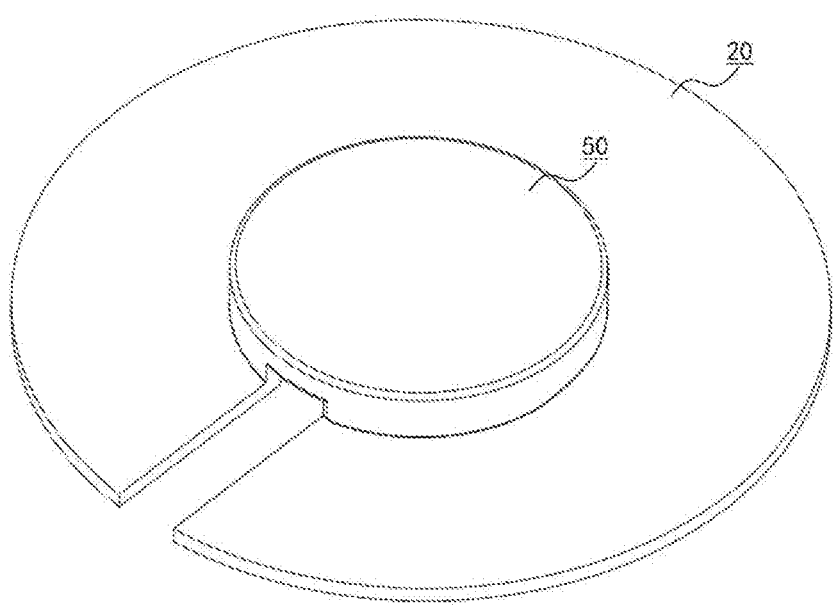
FIG. 7 is a perspective view of a combined state of a first magnetic core and a second magnetic core of a magnetic component according to an embodiment of the present disclosure.

In some embodiments, the second magnetic core 50 and the first magnetic core 20 are separately processed, and the second magnetic core 50 is lapped at one side of the first magnetic core 20. At this time, a buffer sheet may be disposed between the first magnetic core 20 and the second magnetic core 50 to serve as a buffering function, thereby effectively avoiding damage caused by direct lapping of the two cores. However, in some other embodiments, as shown in FIG. 7, the first magnetic core 20 and the second magnetic core 50 may be integrally formed, and it is more convenient for assembly than the case that two magnetic cores are respectively processed. It should be understood that the structure and forming manner of the first magnetic core 20 and the second magnetic core 50 are not limited thereto.

In some embodiments, as shown in FIG. 1, the first insulating support portion 40 includes a first support plate 41 and a first hood 42, wherein the first support plate 41 surrounds the outer circumference of the first hood 42. The first hood 42 is located within the first penetration portion 11, the circuit component 30 is accommodated within the first hood 42, and the winding 10 is placed on the first support plate 41. The first support plate 41 can provide good support for the winding 10, the hood 42 is disposed between the winding 10 and the circuit component 30 to form an insulation therebetween.

In some embodiments, as shown in FIGS. 1 and 3, the winding 10 has a first end A1 and a second end A2. The first hood 42 is provided with a first opening 43 at its outer circumference, and the first end A1 and the second end A2 of the winding 10 may extend into the first hood 42 via the first opening 43. The number of the first openings 43 may be one or more, and the first end A1 and the second end A2 of the winding 10 may extend into the first hood 42 via one first opening 43, or may extends into the first hood 42 via two first openings 43 respectively. When the number of the first openings 43 is plural, for example, two, they may be opened at different positions on the outer circumference of the first hood 42 as desired.

The outer circumference of the first support plate 41 may have an annular flange 44, and the winding 10 is placed between the flange 44 and the outer circumference of the first hood 42 to prevent the winding 10 from being deviated on the first support plate 41. The diameter, height and the like of the first insulating support portion 40 can be adjusted according to the size of the winding 10.

Correspondingly, as shown in FIGS. 5 and 6, the outer circumference of the raised portion 52 of the second magnetic core 50 may be provided with a magnetic core opening 53. The first end A1 and the second end A2 of the winding 10 may extend into the accommodation space 55 via the first opening 43 and the magnetic core opening 53 sequentially. The number of magnetic core openings 53 may be one or more. The first end A1 and the second end A2 of the winding 10 may extend into the accommodation space 55 via one magnetic core opening 53, or may extends into the accommodation space 55 via two magnetic core opening 53 respectively. When the number of magnetic core openings 53 is plural, for example, two, it may be opened at different positions on the outer circumference of the raised portion 52 as desired. The number and position of the magnetic core opening 53 and the first opening 43 may correspond to each other.

In some embodiments, as shown in FIG. 1, the magnetic component may further include a second insulating support portion 70 located within the first penetration portion 11 and disposed between the second magnetic core 50 and the circuit component 30. The second insulating support portion 70 can not only realize insulation of the second magnetic core 50 from the circuit component 30, but also can accommodate and secure the circuit component 30.

The outer circumference of the second insulating support portion 70 may have a second opening 71. The first end A1 and the second end A2 of the winding 10 may sequentially pass through the first opening 43, the magnetic core opening 53 and the second opening 71, and then extend into the inside of the second insulating support portion 70, so as to be electrically connected with the circuit component 30. The number of the second openings 71 may be one or more. The first end A1 and the second end A2 may extend into the inside of the second insulating support portion 70 via one second opening 71, or may extend into the inside of the second insulating support portion 70 via two openings 71. When the number of the second openings 71 is plural, for example, two, it may be opened at different positions on the outer circumference of the second insulating support portion 70 as desired. The number and position of the second opening 71 and the first opening 43 may correspond to each other.

In some embodiments, the magnetic component may be accommodated in a housing 80. Specifically, the housing 80 includes a first housing 81 and a second housing 82, and the above magnetic component is accommodated within a space between the first housing 81 and the second housing 82. The first housing 81 may be an insulating housing, and the second housing 82 may be a metal housing for shielding the magnetic field acting on the external environment. The circuit component 30 can realize power transfer with external of the magnetic component via a power line 60. The first housing 81, the first insulating support portion 40, the raised portion 52 of the second magnetic core 50, and the outer circumference of the second insulating support portion 70 are respectively provided with a first through hole 83, a second through hole 45, and a third through hole 54 and a fourth through hole 72. The first magnetic core 20 is provided with a passage 23 penetrating through its inner circumference and outer circumference. The passage 23 may be disposed along the radial direction of the first magnetic core 20. The power line 60 may extend out of the housing 80 through the fourth through hole 72, the third through hole 54, the passage 23, the second through hole 45 and the first through hole 83.

The winding structure will be described in detail below with reference to FIGS. 8-14.

In some embodiments, the winding 10 is a coil cake (or cake-like coil) structure, for example it may include one or more coil cakes, each of which is formed by winding a coil and has the first end A1 and the second end A2. The first end A1 and the second end A2 are located within the first penetration portion 11 and are both electrically connected with the circuit component 30. By placing the first end A1 and the second end A2 within the first penetration portion 11, interference of the magnetic field can be effectively shielded, so that the problem of overheating caused by heating of high frequency magnetic field can be avoided.

Figure 8:
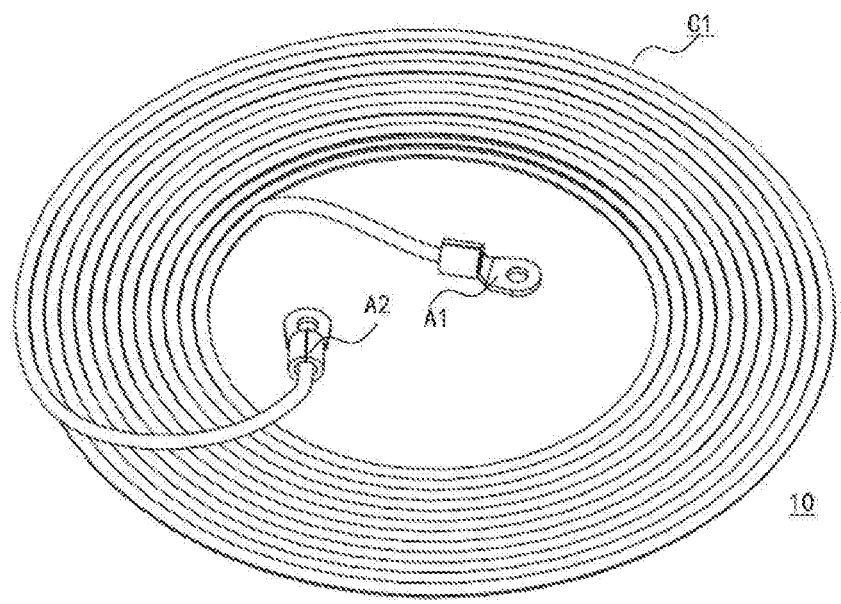
FIG. 8 is a perspective view of a winding of a magnetic component showing a coil cake according to an embodiment of the present disclosure.

In some embodiments, as shown in FIG. 8, the winding 10 is a single-layered coil cake structure. Specifically, the winding 10 includes a first coil cake C1, an end of the inner circumference of the first coil cake C1 serves as the first end A1 of the winding 10, and an end of the outer circumference of the first coil cake C1 serves as the second end A2 of the winding 10. The first coil cake C1 has a first surface and a second surface opposite to each other, such as an upper surface and a lower surface, and the second end A2 extends into the first penetration portion 11 across the first surface. In other embodiments, the second end A2 may also extend into the first penetration portion 11 across the second surface.

In some embodiments, the winding 10 may include a plurality of coil cakes which are stacked, in which hollow portions are aligned and opened up, to form the first penetration portion 11. Hereinafter, forms of the winding 10 will be described by means of a plurality of embodiments, and it should be understood that the number and winding manner of coil cakes in the following embodiments are merely illustrative, and can be adjusted as desired.

Figure 9:
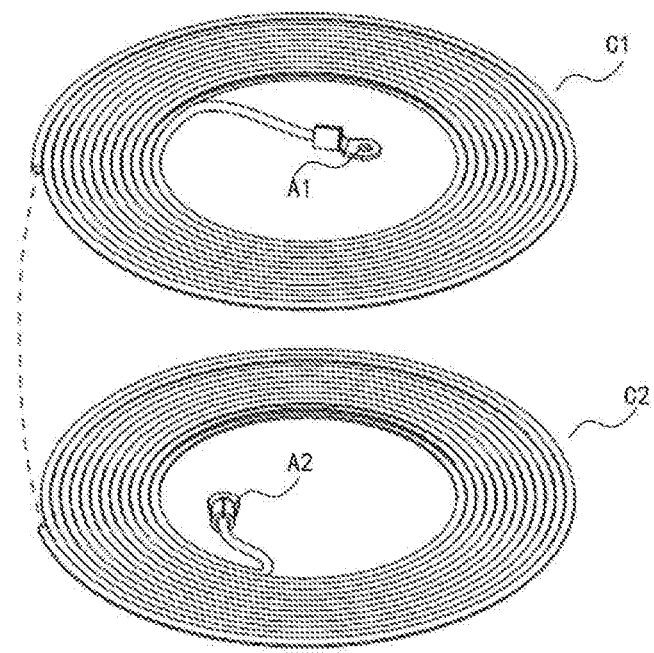
FIG. 9 is a perspective view of a winding of a magnetic component showing two coil cakes according to an embodiment of the present disclosure.

As shown in FIG. 9, the winding 10 is a double-layered coil cake structure. Specifically, the winding 10 includes a first coil cake C1 and a second coil cake C2 stacked coaxially. An end of the inner circumference of the first coil cake C1 serves as a first end A1 of the winding 10, and an end of the inner circumference of the second coil cake C2 serves as the second end A2 of the winding 10. An end of an outer circumference of the first coil cake C1 is electrically connected with an end of an outer circumference of the second coil cake C2.

Figure 12:
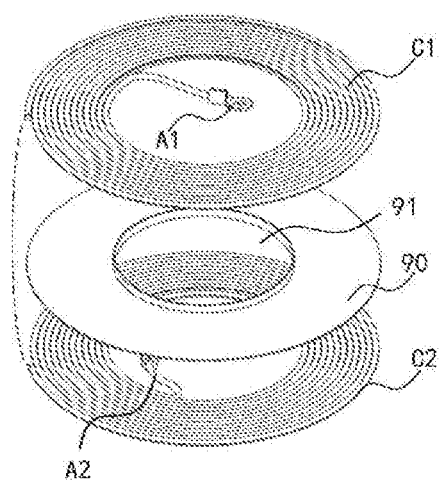
FIG. 12 is a perspective view of a winding of a magnetic component showing two coil cakes according to an embodiment of the present disclosure.

The double-layered coil cake structure connects the coil cakes at the outer circumferences thereof without a jumper wire. Therefore, the height of the winding can be reduced as much as possible while the number of layers of the coil cake is constant. Since the voltage between the two layers of the coil cakes is relatively high, an insulating layer 90 may be added. As shown in FIG. 12, the insulating layer 90 has a third penetration portion 91 which is opened up with the first penetration portion 11.

Figure 10:
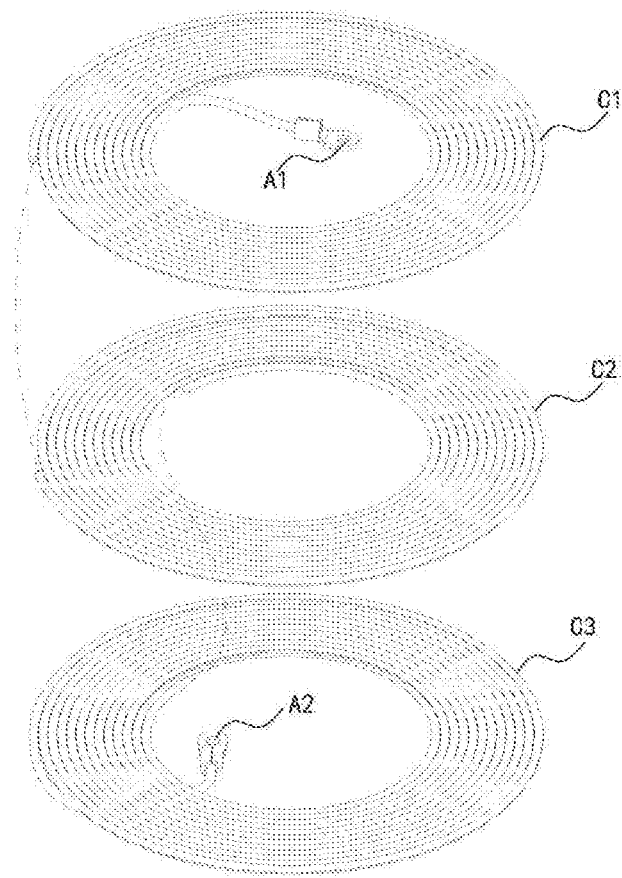
FIG. 10 is a perspective view of a winding of a magnetic component showing three coil cakes according to an embodiment of the present disclosure.

As shown in FIG. 10, the winding 10 is a three-layered coil cake structure. Specifically, the winding 10 includes a first coil cake C1, a second coil cake C2 and a third coil cake C3 which are stacked coaxially. An end of the inner circumference of the first coil cake C1 serves as a first end A1 of the winding 10, an end of the outer circumference of the third-coil cake C3 serves as a second end A2 of the winding 10, an end of the outer circumference of the first coil cake C1 is electrically connected with an end of the outer circumference of the second coil cake C2, and an end of the inner circumference of the second coil cake C2 is electrically connected with an end of the inner circumference of the third coil cake C3. The third coil cake C3 has a first surface and a second surface opposite to each other, and the second end A2 extends into the first penetration portion 11 across the first surface or the second surface. It should be understood that the end of the inner circumference of the second coil cake C2 and the end of the inner circumference of the third coil cake C3 are electrically connected in the first penetration portion 11 thereof without a jumper wire.

In this way, in other embodiments, when the number of layers of the coil cake of the winding 10 is an odd number, the wiring can be separately performed at the outer and inner circumferences thereof respectively, and the connections at the outer or inner circumferences thereof need no jumper wire. However, the first end A1 or the second end A2 still needs a jumper wire to ensure that both the first end A1 and the second end A2 are in the penetration portion 11 of the winding 10.

Figure 11:
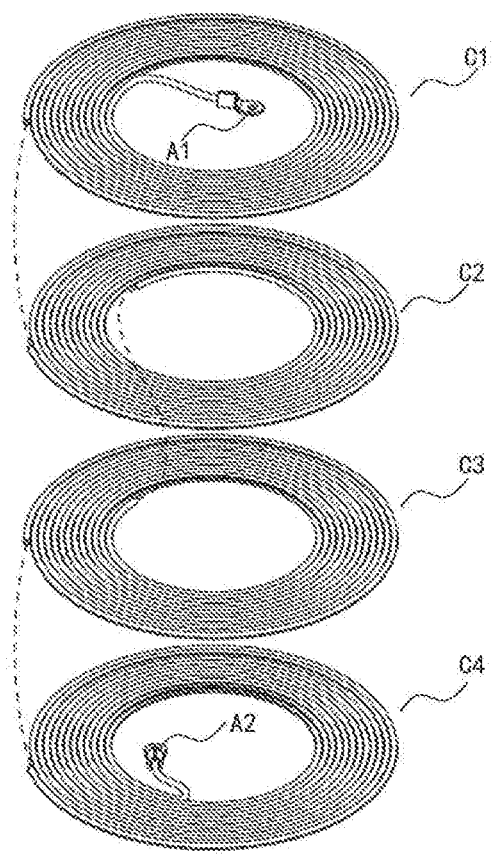
FIG. 11 is a perspective view of a winding of a magnetic component showing four coil cakes according to an embodiment of the present disclosure.

As shown in FIG. 11, the winding 10 is a four-layered coil cake structure. Specifically, the winding 10 includes a first coil cake C1, a second coil cake C2, a third coil cake C3, and a fourth coil cake C4 which are coaxially stacked. An end of the inner circumference of the first coil cake C1 serves as a first end A1 of the winding 10, and an end of the inner circumference of the fourth coil cake C4 serves as the second end A2 of the winding 10. An end of the outer circumference of the first coil cake C1 is electrically connected with an end of the outer circumference of the second coil cake C2, an end of the inner circumference of the second coil cake C2 is electrically connected with an end of the inner circumference of the third coil cake C3, and an end of the outer circumference of the third coil cake C3 is electrically connected with an ends of the outer circumference of the fourth coil cake C4. In the four-layered coil cake structure, the wiring is separately performed at the outer and inner circumferences thereof respectively, and needs no jumper wire, so the height of the winding can be reduced as much as possible.

In this way, in other embodiments, when the number of layers of the wire 10 of the winding 10 is an even number, the wiring is separately performed at the outer and inner circumferences thereof respectively, and needs no jumper wire, which is enough to ensure the first end A1 and the second end A2 being in the penetration portion 11 of the winding 10.

Figure 13:
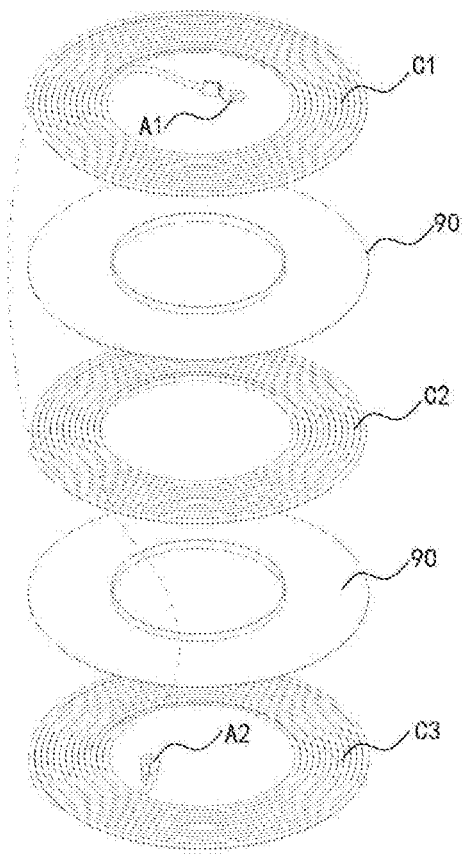
FIG. 13 is a perspective view of a winding of a magnetic component showing three coil cakes according to an embodiment of the present disclosure.
Figure 14:
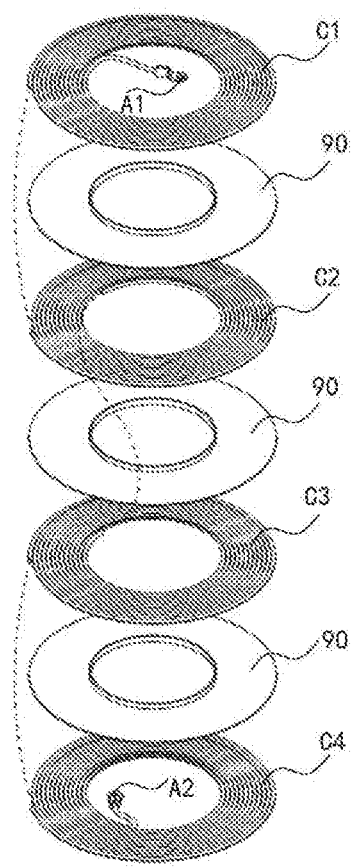
FIG. 14 is a perspective view of a winding of a magnetic component showing four coil cakes according to an embodiment of the present disclosure.

In the above embodiments, in the multi-layered coil cake structure, adjacent two coil cakes are connected at the outer or inner circumferences thereof, thereby reducing jumper wires as much as possible, which is advantageous for reducing the height of the winding. The insulating layer 90 may be disposed between adjacent coil cakes. As shown in FIGS. 13 and 14, the structure of the insulating layer 90 is the same as that of the above embodiment, and thus will not be described here.

In the above embodiments, each of the coil cakes has a single-layered structure, which is formed by winding a coil, and the winding 10 is composed of one or more coil cakes as desired. It should be understood, however, that in other embodiments, the coil cake may be of other structures, for example, the coil cake itself is directly or reversely wound into a multi-layered structure, and then the windings 10 are formed from one or more coil cakes as desired. The coil may be an enameled wire, an enameled wire with an insulating layer or a three-layered insulated wire.

In the above embodiments, the circuit component 30 may include devices such as a printed circuit board, capacitors, and the like. The capacitors are disposed on the printed circuit board and electrically connected with the winding 10, so that the high voltage may be integrated inside of the magnetic component, so as to reduce the voltage on the power line 60, which is more safe and reliable.

Figure 15:
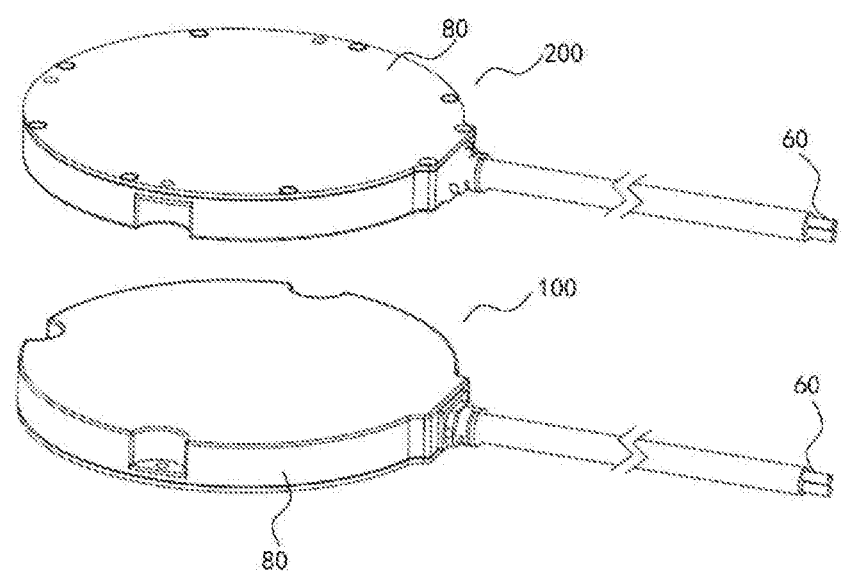
FIG. 15 is a perspective view of a wireless power-transferring device according to an embodiment of the present disclosure.

Referring to FIG. 15, an embodiment of the present disclosure further provides a wireless power-transferring device including a transmitting pad 100 and a receiving pad 200. The magnetic component in both the transmitting pad 100 and the receiving pad 200 may be in the manner shown in the above embodiments. The transmitting pad 100 converts the received electric energy into magnetic energy and outputs the same, and the receiving pad 200 converts the magnetic energy into electric energy to be output. Each of the transmitting pad 100 and the receiving pad 200 includes a housing 80 for accommodating the magnetic component, and the first housing 81 of the transmitting pad 100 and the first housing 81 of the receiving pad 200 are disposed in a face-to-face manner. In other embodiments, only the magnetic component in the transmitting pad 100 or the magnetic component in the receiving pad 200 may be employed in the manner shown in the above embodiments. It should be understood that the application of the magnetic component is not limited thereto, and it may be connected with other electronic devices as desired to realize a corresponding function.

In summary, in the present disclosure, the circuit component is disposed in the middle portion of the winding to save space. When the second magnetic core 50 is disposed at the middle portion of the winding, the magnetic lines hardly pass through the first penetration portion of the center of the winding, so that the conductor inside the first penetration portion, i.e., the circuit component, is in a position where the magnetic field is extremely weak, thereby capable of avoiding the problem of overheating caused by heating of a high frequency magnetic field. When the circuit component includes a capacitor disposed on the printed circuit board and electrically connected with the winding 10, the high voltage can be integrated inside of the magnetic component, so as to reduce the voltage on the power line 60, which is more safe and reliable.

While the present disclosure has been described with respect to the exemplary embodiments, it should be understood that the used terms are illustrative and exemplary without limitative. Since the present disclosure may be embodied in a variety of forms without departing from the spirit or scope of the disclosure, it should be understood that the present disclosure is not limited to the details in the foregoing, but is widely interpreted according to the spirit and scope defined by the appended claims. Therefore, all changes and modifications that come within the scope of the claims or the equivalents thereof are intended to be covered by the appended claims.

What is claimed is:

1. A magnetic component, comprising:
   a winding, formed by winding a coil, and having a first penetration portion at a middle portion of the winding; wherein the first penetration portion is surrounded by the winding;
   a first magnetic core, disposed at a side of the winding, wherein a first insulating support portion is disposed between the first magnetic core and the winding; and
   a circuit component, located within the first penetration portion and electrically connected with the winding;
   wherein the winding has a first end and a second end, the first end and the second end are located within the first penetration portion and both electrically connected with the circuit component;
   the circuit component comprises a printed circuit board and a capacitor, the capacitor is disposed on the printed circuit board and electrically connected with the winding;
   the printed circuit board and the capacitor are located within the first penetration portion.

2. The magnetic component according to claim 1, further comprising:
   a second magnetic core, comprising a cover plate and a raised portion disposed at a side of the cover plate, wherein an accommodation space is formed between the cover plate and the raised portion, the circuit component is located within the accommodation space, and the second magnetic core is located within the first penetration portion.

3. The magnetic component according to claim 2, wherein a middle portion of the first magnetic core has a second penetration portion disposed coaxially with the first penetration portion.

4. The magnetic component according to claim 3, wherein the first magnetic core comprises a plurality of magnetic sheets spliced to form a ring, and an inner portion of the ring constitutes the second penetration portion.

5. The magnetic component according to claim 3, wherein one end of the raised portion of the second magnetic core is connected with the cover plate, the other end of the raised portion is connected with the first magnetic core, and the second penetration portion is opened up with the accommodation space.

6. The magnetic component according to claim 5, wherein a buffer sheet is disposed between the first magnetic core and the second magnetic core.

7. The magnetic component according to claim 2, wherein the first magnetic core is integrally formed with the second magnetic core.

8. The magnetic component according to claim 2, wherein the first insulating support portion comprises a first support plate and a first hood, the first support plate surrounds an outer circumference of the first hood, the first hood is located within the first penetration portion, the circuit component is accommodated inside the first hood, and the winding is supported on the first support plate.

9. The magnetic component according to claim 2, further comprising:
a second insulating support portion, located within the first penetration portion, wherein the circuit component is accommodated and fixed inside the second insulating support portion.

10. The magnetic component according to claim 1, wherein
the winding comprises a first coil cake, the first end is an end of an inner circumference of the first coil cake, and the second end is an end of an outer circumference of the first coil cake, the first coil cake has first and second surfaces opposite to each other, and the second end extends into the first penetration portion across the first surface or the second surface.

11. The magnetic component according to claim 1, wherein
the winding comprises a first coil cake and a second coil cake stacked coaxially, the first end is an end of an inner circumference of the first coil cake, the second end is an end of an inner circumference of the second coil cake, and an end of an outer circumference of the first coil cake is electrically connected with an end of an outer circumference of the second coil cake.

12. The magnetic component according to claim 1, wherein the winding comprises a first coil cake, a second coil cake and a third coil cake stacked coaxially, the first end is an end of an inner circumference of the first coil cake, the second end is an end of an outer circumference of the third coil cake, and an end of an outer circumference of the first coil cake is electrically connected with an end of an outer circumference of the second coil cake, and an end of an inner circumference of the second coil cake is electrically connected with an end of an inner circumference of the third coil cake, the third coil cake has first and second surfaces opposite to each other, and the second end extends into the first penetration portion across the first surface of the third coil cake or the second surface of the third coil cake.

13. The magnetic component according to claim 11, wherein
an insulating layer is disposed between the first coil cake and the second coil cake.

14. The magnetic component according to claim 12, wherein
an insulating layer is disposed between the first coil cake and the second coil cake, and another insulating layer is disposed between the second coil cake and the third coil cake.

15. The magnetic component according to claim 1, wherein the coil is an enameled wire or a three-layered insulated wire.

16. The magnetic component according to claim 1, wherein the coil is an enameled wire with an insulating layer.

17. A wireless power-transferring device, comprising:
a transmitting pad and a receiving pad, wherein at least one of the transmitting pad and the receiving pad comprises the magnetic component according to claim 1.

18. The wireless power-transferring device according to claim 17, wherein
each of the transmitting pad and the receiving pad comprises a housing for accommodating the magnetic component.

* * * * *